Aug. 29, 1967            F. REY            3,338,435
RECIPROCATING LOADING APPARATUS
Filed July 2, 1965            2 Sheets-Sheet 2
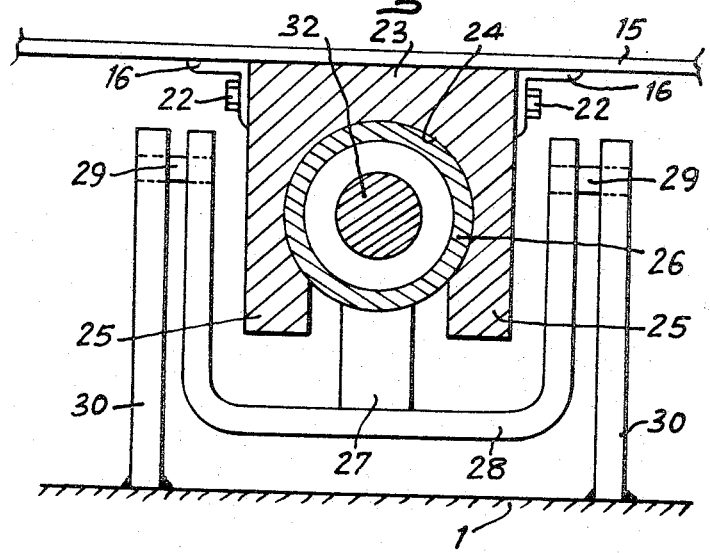
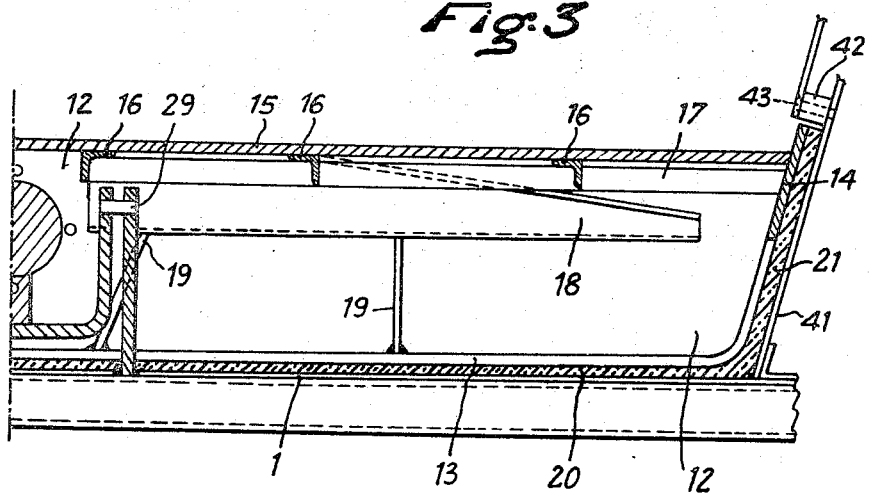
INVENTOR
FERNAND REY
By Linton and Linton
ATTORNEYS

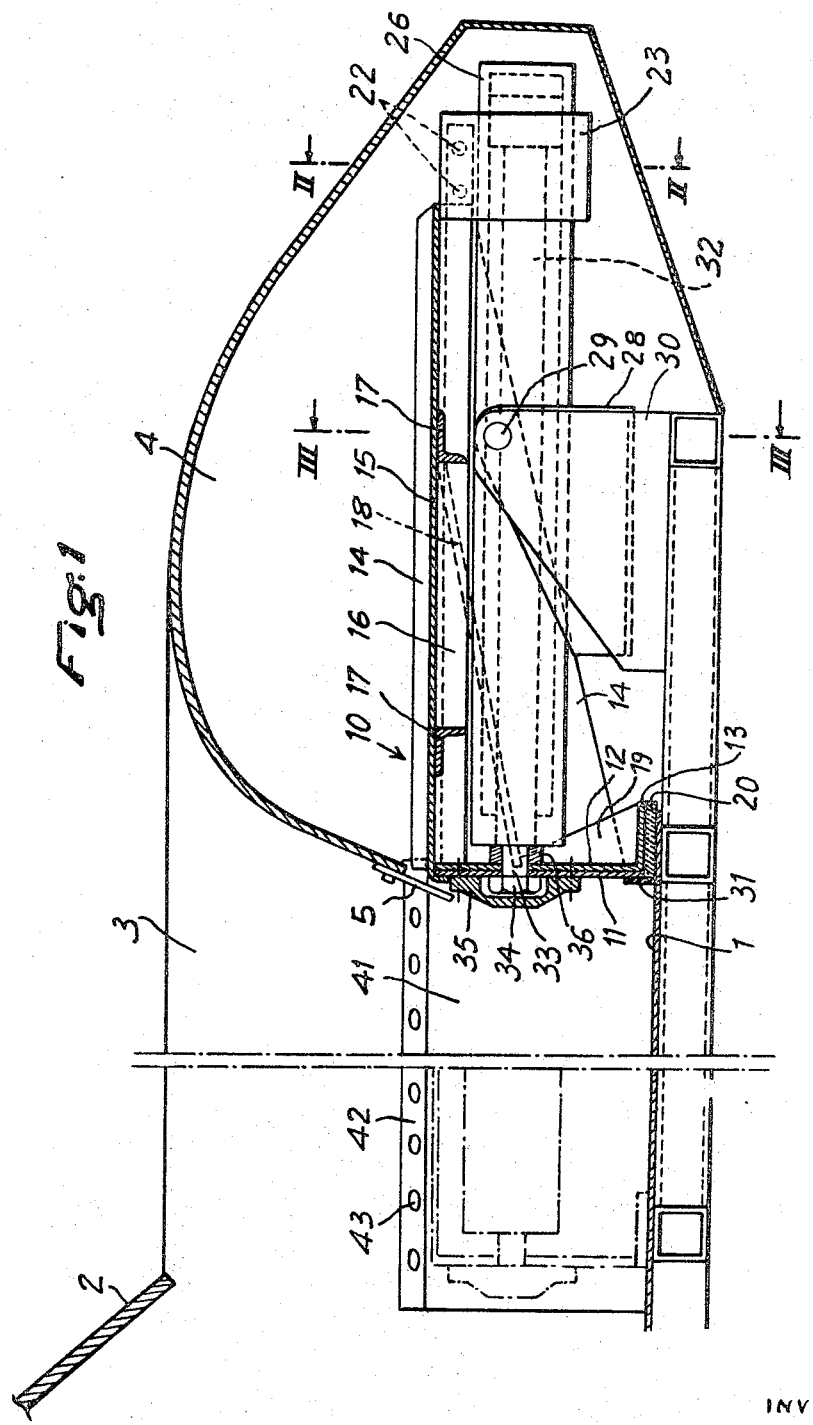

United States Patent Office 3,338,435
Patented Aug. 29, 1967

3,338,435
RECIPROCATING LOADING APPARATUS
Fernand Rey, 2 Rue Antoine Roucher,
Paris 16e, France
Filed July 2, 1965, Ser. No. 469,123
Claims priority, application France, July 15, 1964,
981,712
5 Claims. (Cl. 214—17)

The present invention relates to containers, whether mobile or not, and in particular to carts for collecting domestic refuse or other material which is poured into a receiving hopper located at a low level on the container, for instance in the lower part of a rear door on the container which opens to empty the container when this is tilted backwards. The material received into the hopper is continuously pushed towards the interior of the container by the action of a movable ram in the bottom of the hopper, actuated by a hydraulic jack which moves it to-and-fro.

To ensure a loading rate of the order of several hundred litres per minute, the hopper and the corresponding ram must be of considerable size. Furthermore, it is often desirable to provide large capacity containers of 16 or 18 cubic metres or even more. The loading device provided should permit compression of the material. The compression coefficient, that is to say the ratio between the volume of the material before loading and that after loading may equal or exceed 5. These operating conditions require the use of a loading device applying a considerable force to the material. The loading device is thus submitted to very severe operating conditions, aggravated by the variable nature of the compressed material so there results considerable wear of the frictional surfaces, and the forces may cause deformation and deterioration of the ram and of the associated hydraulic jack.

In previously known devices the ram was generally rigidly attached to the movable shaft of the hydraulic jack, itself rigidly mounted at the back of the loading hopper, and the forces were supported by lateral ram guides, comprising for example rollers carried on the two sides of the ram and running on fixed longitudinal rails integral with the hopper and parallel to the jack axis and the movement of translation. This lateral guidance caused wear of the rollers which were subjected to forces distributed in irregular and varying manners depending on the resistance provided by the material to be compressed. Furthermore the rigidity of the mounting did not allow sufficient sealing of the ram inside the hopper wherein it moved, so that the material could have access to the guide surfaces thus increasing their wear.

The object of the present invention is to overcome these defects by providing a device of a new conception.

According to the present invention, the front wall of the ram is of trapezoidal shape, having its small base towards the bottom against the hopper floor, while its sides diverge upwardly along the lateral walls of a corresponding hopper, the floor and the sides being provided with a sealing fitting resistant to abrasion, this front wall being flexibly affixed to the end of the movable shaft of a jack whose body can pivot on a transverse pintle axis parallel to the hopper floor and act as a slide for a ring integral with the ram, to ensure the centering thereof.

The trapezoidal shape, combined with the jack's ability to pivot, has the effect of automatically ensuring a reduction in the wear on the frictional fittings by a slight descent of the ram into the hopper interior, the pivoting axis of the jack being at such a height that the reaction of the material on the ram is on a line passing below said axis, thus having a constant tendency to force the ram against the hopper floor.

Furthermore, the flexible fixation provided between the front wall of the ram and the movable shaft of the jack allows some adaptation of the ram to unequal wear or slight deformation, the totality of the frictional surfaces producing acceptable unitary forces.

Finally, the central guidance on the actual jack body by means of a strong ring connected to the ram framework ensures a good balance of the ram, which no longer risks applying excessive forces to highly localized frictional areas, and also no longer risks wedging: also the frictional parts are better protected because of the improved ram sealing.

One embodiment of a centrally guided loading device in accordance with the present invention will now be described with reference to the attached drawings in which:

FIGURE 1 is a view in longitudinal section of the rear of a collecting cart including a ram according to the present invention;

FIGURE 2 is a section on a larger scale on the line II—II of FIGURE 1; and

FIGURE 3 is a section on the line III—III of FIGURE 1.

In the drawing, 1 is the base of the loading hopper connecting the base of the container, and 2 is the rear of the cart body prolonged by a receiving hopper having an opening 3 for discharging the material. In the base and at the rear of the hopper is formed a housing 4 opened to the front and edged with a flexible scraper 5 intended to seal against the material the interior of the housing 4 through which passes a ram generally indicated by 10.

The ram has a front wall 11 of a trapezoidal shape with its small base at the bottom and its two sides upwardly diverging. This front wall 11 is stiffened by a plate 12 bent in L or other shape to constitute a lower wall 13 for the ram. Lateral ram-walls 14 extend back from the lateral edges of the front wall 11, and a horizontal upper plate 15 is connected to front wall 11 and lateral walls 14. Longtiudinal cross-bars 16 and transverse cross-bars 17 carry and stiffen the ram upper plate 15. To avoid as far as possible deformations in the ram casing thus formed, inclined stiffening plates 18 also extend either side of the longitudinal axis of the ram between the front wall 11 and the rear of the upper plate 15 (see FIGURES 1 and 3). Gussets 19 welded into the angle formed by stiffening plates 12 and 13 provide further stiffening of the ram casing.

Under the lower ram-wall 13 is mounted an anti-friction bearing fitting 20 which can be replaced when used up. Likewise, mounted anti-friction bearing fittings 21 are also fixed on side walls 14. The external face of the front wall 11 has at its base a scraper 31 of wear-resistant flexible material protecting bearing fitting 20 against contact with bodies which could damage it.

Between the rear ends of the two longitudinal cross-bars 16 nearest the ram's longitudinal axis, and attached, for example by bolts 22, is a ring 23 (FIG. 2) having a cylindrical surface cavity 24 which forms two downwardly directed symmetrical extensions 25. The cylindrical cavity 24 of the ring cooperates with the cylindrical body surface of double-acting jack 26 on which the ring can slide. The body of jack 26 is attached by means of a fixing cross-bar 27 in a cradle 28 which can pivot about suspension pintles 29 mounted integral with fixed cheeks 30 welded to the floor of hopper 1, which allows the jack 26 to pivot vertically to some extent. It will be noted that the pintles 29 are above the longitudinal axis of the jack so that reaction forces which are opposed to the forward thrust of the ram have a resultant tending to make the jack pivot in the direction which lowers its head and the ram front wall 11, thus ensuring that the ram is kept in contact with the floor of the loading passage.

In the body of jack 26 there reciprocates a jack shaft or piston shaft 32 whose outer front end 33 extends through the front wall 11 of the ram and is made integral therewith by a nut 34 screwed on to the projecting end of the shaft 32. A disc 35 connected to the ram front wall 11 covers the joint between the shaft 32 and the ram and seals the joint from the material being handled.

It will be noted that between the ram front wall 11 and the front end of the body of jack 26, the shaft 32 carries a series 36 of elastic washers which allow a slight play of the ram relative to the jack shaft.

During operation the ram 10 moves in a hopper whose base is shown at 1 and of shape corresponding to the trapezoidal shape of the ram and including the hopper floor 1 and the ram two side walls 41. Longitudinal stops 42 adjustable in height and fixed by bolts 43 in the upper part of the side walls 41 limit any displacement due to accidental dynamic forces on the ram.

FIGURE 1 shows in dotted lines the fully advanced position taken by the ram at the end of its forward stroke.

The pintle pivot 29 ensures the flexibility of the trash collecting device by allowing the ram 10 to orientate itself in proper position on its seating. However, it is obvious that this flexibility could be attained by other equivalent means, for instance by connecting the rear of the jack 26 to the cart chassis by a ball joint instead of using pivot 29. The jack could also be rigidly mounted on the cart chassis and the required flexibility of the ram obtained by flexible or articulated joints between the ram and another central guide ring similar to ring 23.

What I claim is:

1. A device for loading material into a container having a loading hopper having a floor and an opening for discharging the material, said device comprising a ram mounted on the floor of said hopper and being reciprocated parallel to said floor, said ram and said hopper having congruent shapes, sealed fittings mounted on said ram, a double-acting jack, supporting means fixed to the floor of said hopper for supporting said double-acting jack, elastic means for connecting the end of said jack to the ram, a ring integral with said ram mounted around the body of said jack so that jack body acts as a slide for the ring providing central guidance of the ram.

2. A device for loading material into a container having a loading hopper having a floor and an opening for discharging the material, said device comprising a ram formed by a front working wall of trapezoidal shape with the small base at the bottom and being reciprocatingly mounted parallel to the floor of the hopper which is of corresponding shape, sealed fittings fixed on said ram, a double-acting jack, supporting means fixed to the floor of said hopper for supporting said double-acting jack, elastic means for connecting the end of said jack to said ram, and a ring integral with said ram mounted around the body of said jack so that the jack body acts as a slide for said ring providing central guidance of the ram.

3. A device for loading material into a container having a loading hopper with an opening for discharging the material, said device comprising a ram mounted on the floor of said hopper and being formed by a front working wall of trapezoidal shape with the small base at the bottom and having upwardly diverging side edges and being reciprocated parallel to the floor of said hopper which is of corresponding shape, sealed fittings being fixed to the lower small base of said wall and to the upwardly diverging side edges of said working wall of the ram, said fittings being located behind the ram wall, a double-acting jack, supporting means fixed to the floor of said hopper for supporting said double-acting jack, elastic means for connecting the end of said jack to the ram, and a ring integral with said ram mounted around the body of said jack so that jack body acts as a slide for the ring, providing central guidance of the ram.

4. A device for loading material into a container having a loading hopper with having a floor and an opening for discharging the material, said device comprising a ram formed by a front working wall of trapezoidal shape with the small base at the bottom and having upwardly diverging side edges, and being reciprocatingly mounted parallel to the floor of said hopper of corresponding shape, sealed fittings being fixed to the lower small base of said ram and to the upwardly diverging side edges of said working wall of the ram, said fittings being located behind the ram wall, a double-acting jack, supporting means fixed to the floor of said hopper for supporting said jack, elastic means for connecting the end of said jack to the ram, and a ring connected with said ram mounted around the body of said jack so that jack body acts as a slide for said ring, providing central guidance of the ram.

5. A device for loading material into a container having a loading hopper with an opening for discharging the material, said device comprising a ram formed by a front working wall of trapezoidal shape with the small base at the bottom and being reciprocatingly mounted parallel to the floor of a hopper of corresponding shape, sealed fittings being fixed to the lower small base and to the upwardly diverging side edges of said working wall of the ram, said fittings being located behind the ram wall bearing, a double-acting jack having an axis and the body of which is suspended on a transverse pintle parallel to the hopper floor and being journalled in supporting means fixed to the floor of said hopper for being able to pivot in a vertical plane about said pintle, said transverse axis being located at a higher level than the jack axis, elastic means for connecting the end of said jack to the ram, and a ring integral with said ram mounted around the body of said jack so that jack body acts as a slide for the ring ensuring central guidance of the ram.

References Cited

UNITED STATES PATENTS

| | | | |
|---|---|---|---|
| 1,921,771 | 8/1933 | O'Hara | 198—226 |
| 2,996,203 | 8/1961 | Rosaia | 214—82 |
| 3,172,338 | 3/1965 | Ackerman | 92—107 X |

GERALD M. FORLENZA, *Primary Examiner.*

ROBERT G. SHERIDAN, *Examiner.*